(12) United States Patent
Czlapinski et al.

(10) Patent No.: US 9,389,613 B2
(45) Date of Patent: Jul. 12, 2016

(54) DETERMINING TURNING RADIUS OF COUPLED VEHICLES

(71) Applicant: International Truck Intellectual Property Company, LLC, Lisle, IL (US)

(72) Inventors: Craig Robert Czlapinski, Westchester, IL (US); Ilya Sagalovich, Naperville, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 18 days.

(21) Appl. No.: 14/541,399

(22) Filed: Nov. 14, 2014

(65) Prior Publication Data

US 2016/0139599 A1    May 19, 2016

(51) Int. Cl.
| | | |
|---|---|---|
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 17/00* | (2006.01) | |
| *G06F 19/00* | (2011.01) | |
| *G05D 1/02* | (2006.01) | |
| *B62D 53/08* | (2006.01) | |
| *B62D 53/06* | (2006.01) | |
| *B62D 13/00* | (2006.01) | |

(52) U.S. Cl.
CPC .............. *G05D 1/0212* (2013.01); *B62D 13/00* (2013.01); *B62D 53/06* (2013.01); *B62D 53/08* (2013.01); *G05D 2201/0213* (2013.01)

(58) Field of Classification Search
CPC .. G05D 1/0212; B62D 13/06; B62D 15/0285; B62D 15/0275; B62D 11/24; B62D 11/003; B62D 9/00; B62D 11/20; B62D 12/00; B62D 11/06; B62D 11/04; B62D 49/065; B62D 9/002; B62D 11/08; B62D 29/043; B62D 31/025
USPC ................ 701/1, 41, 72; 180/14.1, 14.6, 421, 180/24.01; 56/14.7, 114
See application file for complete search history.

(56) References Cited

U.S. PATENT DOCUMENTS

| | | | | | |
|---|---|---|---|---|---|
| 4,237,994 | A | * | 12/1980 | McColl | B60G 5/02 180/179 |
| 4,982,976 | A | * | 1/1991 | Kramer | B62D 13/04 280/426 |
| 5,411,322 | A | * | 5/1995 | Breen | B60T 8/1708 303/150 |
| 5,523,947 | A | * | 6/1996 | Breen | B60T 8/1708 280/400 |
| 5,579,228 | A | * | 11/1996 | Kimbrough | B60D 1/06 180/14.6 |
| 8,036,792 | B2 | * | 10/2011 | Dechamp | B62D 15/027 180/235 |
| 8,073,594 | B2 | | 12/2011 | Lee | |
| 2005/0206229 | A1 | * | 9/2005 | Lu | B60T 7/20 303/123 |
| 2008/0257629 | A1 | * | 10/2008 | Olsson | B60K 6/12 180/197 |

(Continued)

*Primary Examiner* — Jaime Figueroa
(74) *Attorney, Agent, or Firm* — Jeffrey P. Calfa; Mark C. Bach

(57) ABSTRACT

Turning radius of a tractor-trailer is calculated by certain dimensional relationships in the tractor-trailer and rotational velocities of axle wheel groups.

13 Claims, 6 Drawing Sheets

(56) References Cited

U.S. PATENT DOCUMENTS

| | | |
|---|---|---|
| 2011/0295470 A1 | 12/2011 | Burchett |
| 2013/0024064 A1* | 1/2013 | Shepard .................. B62D 13/06 701/23 |
| 2014/0019010 A1 | 1/2014 | Smith |
| 2014/0249691 A1* | 9/2014 | Hafner .................. B62D 13/06 701/1 |
| 2014/0303849 A1* | 10/2014 | Hafner .................. B62D 13/06 701/42 |
| 2015/0367886 A1* | 12/2015 | Lavoie .................. B62D 13/06 701/41 |

* cited by examiner

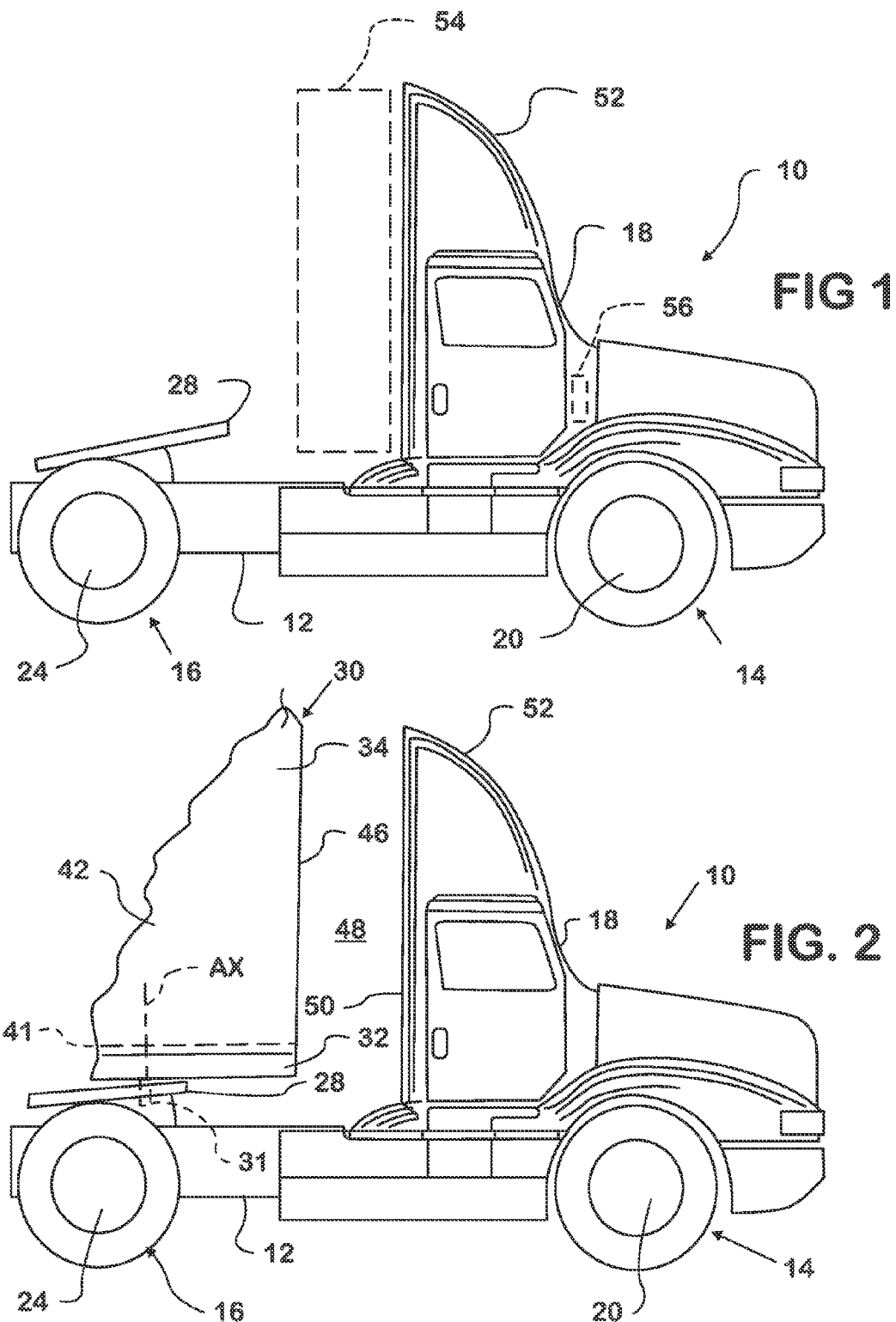

$$70 \longrightarrow \frac{\omega_o}{T_w + r_i} = \frac{\omega_o - \omega_i}{T_w}$$

$$72 \longrightarrow r_i = \frac{\omega_o T_w}{\omega_o - \omega_i} - T_w$$

$$60 \longrightarrow r_t = \frac{\omega_o T_w}{\omega_o - \omega_i} - \frac{T_w}{2}$$

DETERMINING TURNING RADIUS OF COUPLED VEHICLES

U.S. GOVERNMENT RIGHTS

This disclosure was made with United States government support under Award No. DE-EE0003303 awarded by the U.S. Department of Energy. The United States government has certain rights in this disclosure.

FIELD OF THE DISCLOSURE

This disclosure relates to a towing vehicle, such as a tractor of a tractor-trailer, and a towed vehicle, such a trailer of a tractor-trailer, which are connected together by a coupling which provides a vertical axis about which the towed vehicle can swing relative to the towing vehicle.

BACKGROUND OF THE DISCLOSURE

One example of a coupling of a trailer to a highway tractor which provides a vertical axis about which the trailer can swing relative to the tractor comprises a fifth wheel supported on a chassis frame of a tractor and a kingpin on a trailer which locks to the fifth wheel. As the trailer swings about the vertical axis, the angle between its longitudinal centerline and that of the tractor changes. That angle is referred to as the articulation angle.

Aerodynamic drag is imposed on a tractor-trailer by a gap between a cab of the tractor and a body of the trailer as the tractor-trailer travels along a roadway. The dimensions of the gap and the traveling speed of the tractor-trailer influence the magnitude of aerodynamic drag. In general, the greater the size of the gap and the greater the traveling speed, the greater the aerodynamic drag.

Steering the tractor of a moving tractor-trailer into a turn initially causes the path of a trailer rear axle group to depart from the paths of travel of front and rear axle groups of the tractor because the tractor will turn faster into the turn than the trailer. That departure results in the articulation angle increasing as turning radius of a rear axle group of the trailer becomes greater than the turning radii of the front and rear axle groups of the tractor. If the steering angle of the tractor is held constant as a turn continues, the trailer's longitudinal centerline swings back toward the tractor's longitudinal centerline and the turning radius of the trailer rear axle group will approach the turning radii of the front and rear axle groups of the tractor.

While minimizing distance between a rear of a tractor cab and a front of a trailer body is often an appropriate practice for minimizing gap-induced aerodynamic drag, the gap size should be sufficiently generous to avoid the trailer body hitting the tractor cab and any other structures in the vicinity of the gap over a potential range for the articulation angle.

A fifth wheel may be fastened to a tractor chassis frame so that its fore-aft position relative to the tractor cab is non-adjustable, or it may be mounted via an adjustment mechanism which allows its fore-aft position to be set to any of multiple distances from the tractor cab which inherently set the size of the gap between the tractor and the trailer. Whether the distance from a trailer body to a tractor cab is fixed or can be set to any one of several different distances, the distance influences aerodynamic drag on the moving tractor-trailer.

Various known methods and devices are available for reducing aerodynamic drag caused by a gap between a highway tractor and a trailer. Setting position of a fifth wheel is one example, but that procedure is typically done prior to, and not during, travel of a tractor-trailer on a roadway.

Another example is the deployment of structures which are sometimes referred to as fairings. Fairings may be mounted on a tractor and/or a trailer and may be deployed between tractor and trailer to reduce aerodynamic drag without changing gap size while the tractor-trailer is traveling.

SUMMARY OF THE DISCLOSURE

This disclosure introduces a method for calculating an estimate of a turning radius of a towing vehicle and a towed vehicle which is being towed by the towing vehicle through a coupling which allows the towed vehicle to articulate horizontally with respect to the towing vehicle over a range of articulation angles.

After a driver of a highway tractor has steered the tractor into a turn and the trailer has swung to a position in which path of travel of a rear axle group of the trailer closely tracks that of axle groups of the tractor, the method calculates an estimate of a turning radius using certain information about one or more of the axle groups. As will be more fully explained later, a turning radius calculation may be used for additional calculations, the articulation angle between tractor and trailer being one example, and/or control functions. Rate of change of the turning radius and/or rate of change of the articulation angle can be calculated and used for controlling deployment of a gap treatment device such as a fairing or fairings between tractor and trailer.

When rate of change of articulation angle and/or rate of change of turning radius become less than a target rate below which a center of a turning radius of an axle group of the towing vehicle and the center of a turning radius of an axle group of the towed vehicle are both within a zone of coincidence suitable for calculating an estimate of the articulation angle to within a given tolerance, an estimate of length of the turning radius is calculated. In other words, if rate of change of either articulation angle or turning radius is too great for calculating an estimate of turning radius to within a given tolerance, the calculation is not made, or if made, is not used for any control purpose or calculation of articulation angle.

An estimate of turning radius length is calculated using a measurement of rotational velocity of a radially outer wheel group of an axle group and a measurement of rotational velocity of a radially inner wheel group of an axle group.

The rotational velocity measurements and a dimensional relationship of the radially outer wheel group to the radially inner wheel group are then used in a calculation for estimating length of the axle group turning radius.

A highway tractor-trailer is one example of a towing vehicle and a towed vehicle which can articulate with respect to each other about a vertical axis at their point of coupling. The tractor comprises a tractor cab supported on a tractor chassis frame and the trailer comprises a trailer body supported on a trailer chassis frame. A gap exists between a front of the trailer body and a rear of the tractor cab. Dimensions of the gap influence aerodynamic drag on the tractor-trailer when traveling on a roadway. Gap size may be set by positioning a tractor's fifth wheel on the tractor chassis frame. A gap treatment device, such as a movable fairing or fairings on the tractor and/or trailer at the gap, can also provide some degree of aerodynamic drag reduction.

Dead reckoning may also be used to calculate an estimate of turning radius of a trailer rear axle group, and subsequently an estimate of articulation angle, without using rotational velocity data from inner and outer wheel groups of the trailer rear axle group.

Estimation of turning radius and the associated articulation angle can be beneficial to stability control systems as well. For towing vehicles, where the wheels of one of the axles do not have fixed orientation relative to wheels of another due to the towing vehicle being steered, estimation of turning radius can be used to manage the resultant braking force vector during an aggressive braking event. The ability to manage the braking force vector may avoid a situation where the articulation angle undesirably increases as a result of unbalanced braking between the towing and towed bodies (also known as jack-knifing).

Accordingly the present disclosure relates to a towing vehicle and a towed vehicle which is towed by the towing vehicle through a coupling which allows the towed vehicle to articulate horizontally with respect to the towing vehicle over a range of articulation angles.

The towing vehicle has a towing vehicle front axle group and a towing vehicle rear axle group.

The towed vehicle has a towed vehicle rear axle group.

Sources provide data indicative of rotational velocity of a radially outer wheel group of an axle group and data indicative of rotational velocity of a radially inner wheel group of an axle group.

A processor is programmed with an executable algorithm for processing data from the sources and a dimensional relationship of the radially outer wheel group to the radially inner wheel group to calculate an estimate of a turning radius for the towing vehicle and the towed vehicle.

The present disclosure also relates to a method for calculating an estimate of a turning radius for a towing vehicle and a towed vehicle which is being towed by the towing vehicle through a coupling which allows the towed vehicle to articulate horizontally with respect to the towing vehicle over a range of articulation angles.

The method comprises detecting rate of change of at least one of articulation angle and turning radius being less than a target rate below which a center of a turning radius of an axle group of the towing vehicle and the center of a turning radius of an axle group of the towed vehicle are within a zone of coincidence suitable for calculating an estimate of at least one of articulation angle and turning radius to within a given tolerance.

With the centers lying within the zone of coincidence, a measurement of rotational velocity of a radially outer wheel group of an axle group is taken and a measurement of rotational velocity of a radially inner wheel group of an axle group is also taken.

The rotational velocity measurements and a dimensional relationship of the radially outer wheel group to the radially inner wheel group are used in a calculation of an estimate of a turning radius of the towing vehicle and the towed vehicle.

The present disclosure also relates to a towing vehicle—towed vehicle combination comprising a towing vehicle and a towed vehicle which is towed by the towing vehicle through a coupling which allows the towed vehicle to articulate horizontally with respect to the towing vehicle over a range of articulation angles. The towing vehicle comprises a towing vehicle front axle group and a towing vehicle rear axle group, and the towed vehicle comprises a towed vehicle rear axle group.

A source of data indicates rotational velocity of a radially outer wheel group of a towing vehicle axle group, and a source of data indicates rotational velocity of a radially inner wheel group of a towing vehicle axle group.

A processor comprises an executable algorithm for processing data from the sources to mathematically integrate rotational velocity of the radially outer wheel group of a towing vehicle axle group and mathematically integrate rotational velocity of the radially inner wheel group of a towing vehicle axle group over an interval of time beginning with commencement of a turn when the articulation angle is 0° and to use difference between a result of one integration and a result of the other integration to calculate an estimate of articulation angle at the end of the interval of time.

The foregoing summary, accompanied by further detail of the disclosure, will be presented in the Detailed Description below with reference to the following drawings that are part of this disclosure.

BRIEF DESCRIPTION OF THE DRAWINGS

FIG. 1 is a right side elevation view of a highway tractor.

FIG. 2 is a right side elevation view of the highway tractor including a portion of trailer which is being towed in a straight direction by the highway tractor.

DETAILED DESCRIPTION

Figure 3:
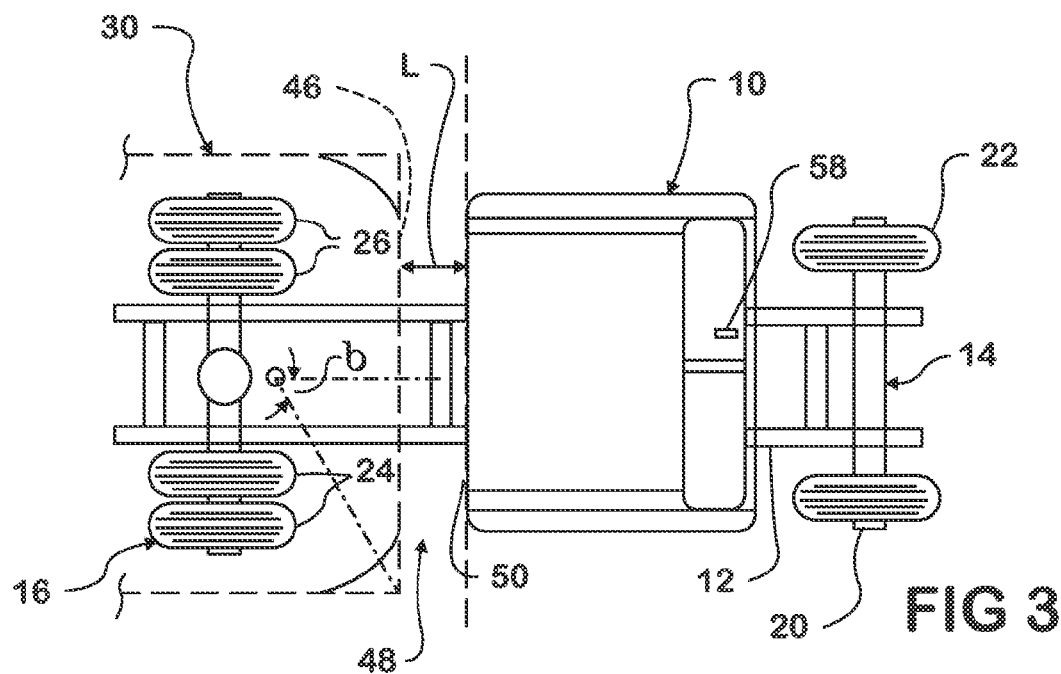
FIG. 3 is a diagrammatic top plan view of FIG. 2.

FIGS. 1-4 show an example of a tractor-trailer comprising a highway tractor 10 which has a tractor chassis frame 12, a front axle group 14 and a rear axle group 16 suspended from chassis frame 12, and a cab 18 mounted on chassis frame 12. Front axle group 14 comprises a right front wheel 20 and a left front wheel 22 for steering tractor 10. Rear axle group 16 is a single drive axle which comprises right rear dual wheels 24 and left rear dual wheels 26 which are coupled to an engine-driven powertrain for propelling tractor 10 on a roadway. Other possible embodiments for rear axle group 16, such as tandem drive axles for one example, are not illustrated.

A fifth wheel 28 supported on chassis frame 12 rearward of cab 18 provides for a trailer 30 to be connected to tractor 10 for towing by the tractor. The connection is made by a coupling which comprises a kingpin 31 of trailer 30 which locks to fifth wheel 28. The coupling allows trailer 30 to swing horizontally with respect to tractor 10 about a vertical axis AX over a range of articulation angles.

Trailer 30 comprises a trailer chassis frame 32 on which a trailer body 34 is mounted. A trailer rear axle group 36 (see FIGS. 5-7) is suspended from trailer chassis frame 32 at the rear of trailer 30. Trailer rear axle group 36 is representative of a single axle having right dual wheels 38 and left dual wheels 40. Other possible embodiments for trailer rear axle group 36, such as a rear bogey having tandem axles for example, are not illustrated.

Trailer body 34 comprises an interior floor 41 bounded by upright right and left side walls 42, 44 and an upright front wall 46. The trailer interior is covered by a roof which is fastened to the upright walls. Access to the trailer interior is provided by double doors 47 at the rear which can swing open and closed.

A gap 48 exists between front wall 46 of trailer body 34 and a rear wall 50 of tractor cab 18. When the tractor-trailer is traveling on a roadway, a deflector 52 mounted atop cab 18 can reduce aerodynamic drag by directing flow of ram air over gap 48 and along the trailer roof.

Fifth wheel 28 may be fastened to chassis frame 12 in a fixed location or may be movable to different positions along the length of the chassis frame. Length L of gap 48, meaning distance between rear wall 50 and front wall 46 when the tractor-trailer is traveling in a straight line as shown in FIG. 3, is set by the position of fifth wheel 28 on tractor chassis frame 12 and the location of kingpin 31 on trailer 30.

Regardless of whether fifth wheel 28 is or is not positionable on chassis frame 12, gap length L should be sufficiently great to allow trailer 30 to swing without interfering with tractor cab 18 or other structures which may be present in the vicinity of cab rear wall 50. The presence of any gap has an influence on aerodynamic drag which occurs during travel of a tractor-trailer on a roadway even in the presence of a drag-reducing device like deflector 52.

An example of a drag-reducing device other than deflector 52 may be generically described as a gap treatment device, one example of which is a fairing or fairings on the tractor and/or trailer at the gap. Some gap treatment devices are non-movably affixed to the tractor and/or the trailer. Others are movable and can be moved relative to the gap from a non-deployed position to a deployed position to reduce aerodynamic drag when the tractor-trailer is traveling along a roadway, especially when traveling along a relatively straight roadway at highway speeds. During that type of travel, the tractor is typically not subject to sharp changes in the direction in which it is being steered and because of that, a deployed gap treatment device can remain deployed. When steering direction changes more sharply and/or suddenly, it may be appropriate to move a deployed gap treatment device to non-deployed position so that it doesn't interfere with the tractor and/or the trailer during turning A generic gap treatment device is indicated schematically in FIG. 1 and identified by the reference numeral 54.

An on-board controller 56 which controls positioning of gap treatment device 54 can cause the device to be moved from deployed position to non-deployed position upon detection of sharp and/or sudden changes in steering direction. A steering position sensor 58, which may be associated with the steering system of tractor 10, can provide an input for processing by controller 56. By evaluating rate of change in steering position, controller 56 can distinguish a steering condition which is appropriate for deployment of a gap treatment device from a steering condition which is inappropriate for deployment. A calculation of an estimate of turning radius of a tractor-trailer may be used as a basis for controlling gap treatment device 54.

Controller 56 comprises a processor which executes an algorithm for calculating turning radius of any axle group of the tractor-trailer.

Figures 7, 8:
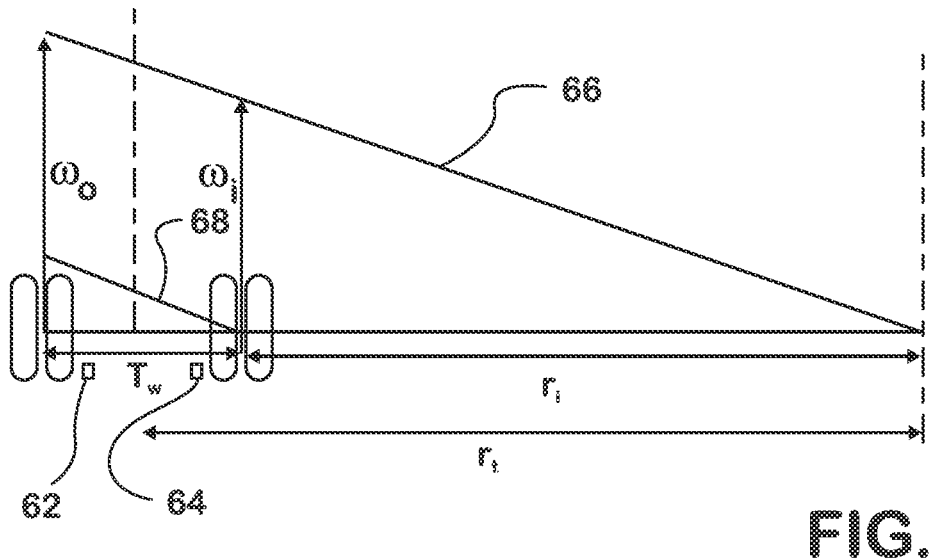
FIG. 7 is a diagrammatic view showing certain geometric principles involved in determining a turning radius.
FIG. 8 shows derivation of a formula for calculating turning radius which is a result of application of the geometric principles of FIG. 7.

The algorithm performs a calculation of turning radius $r_t$ in FIG. 7 using an equation 60, shown in FIG. 8 for a right turn, which contains the following dimensional parameters: $r_i$, distance of a right wheel group of an axle group from an instantaneous center of a turning radius for the axle group; and $T_w$, distance between the right wheel group and a left wheel group of the axle group.

Equation 60 also uses: $\omega_o$, instantaneous rotational velocity of a left (outer) wheel group; and $\omega_i$, instantaneous rotational velocity of a right (inner) wheel group. $\omega_o$ is velocity data derived from a left wheel speed sensor 62 which is associated with the left wheel group and $\omega_i$ is velocity data derived from a right wheel speed sensor 64 which is associated with the right wheel group.

As a tractor-trailer turns right, a left wheel group has a greater rotational velocity than a right wheel group of the same axle group because the left wheel group is more distant from the instantaneous center of a turning radius for the axle group than is the right wheel group, as graphically portrayed in FIG. 7 by the velocity vectors for the left and right wheel group velocities. Although FIG. 7 shows a single axle having right and left dual wheels, that particular example is intended to represent any of various axle group embodiments.

Equation 60 is based on geometric considerations which are described with reference to FIGS. 7 and 8.

For a sufficiently large turning radius, the velocity vector $\omega_o$ may be considered one leg of an approximate right triangle 66 and the sum of $r_i$ and $T_w$ may be considered the other leg. Likewise, the difference $\omega_o - \omega_i$ may be considered one leg of an approximate right triangle 68 which is substantially similar to, but smaller than, triangle 66, and $T_w$ may be considered the other leg of the smaller triangle.

Because the two triangles are substantially similar, the ratio of the smaller leg of triangle 66 to its larger leg is substantially identical to that of the smaller leg of triangle 68 to its larger leg, as expressed by a mathematical equation 70 in FIG. 8.

Figure 5:
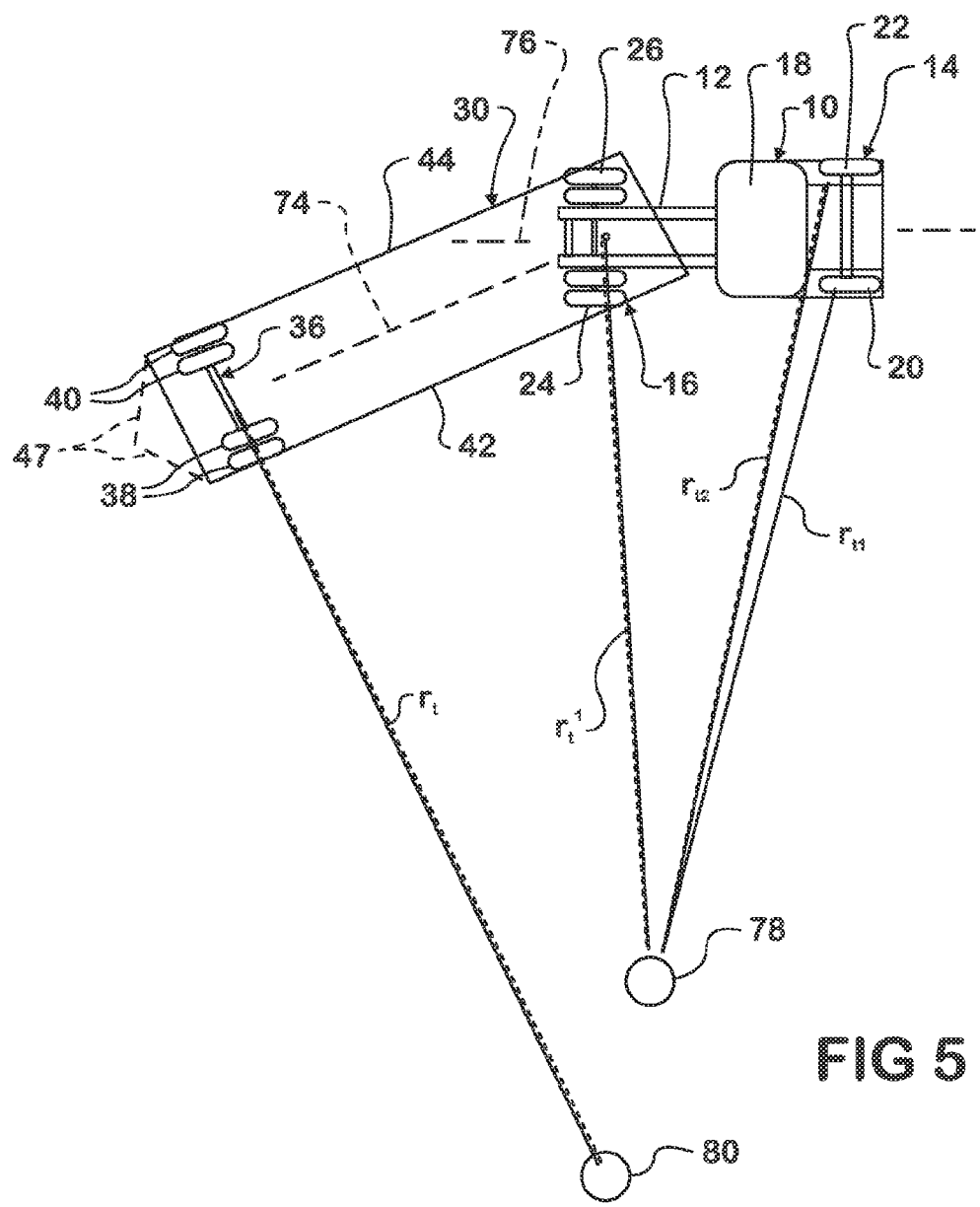
FIG. 5 is a top plan snapshot view of the tractor-trailer during a turn to the right.

When equation 70 is solved for $r_i$ to create an equation 72 in FIG. 8 and one half of $r_t$ is added to that solution, equation 60 results and can then be used to calculate a turning radius of any axle group as measured from the point on which the radius is instantaneously centered to the mid-point of the axle group. FIG. 5 shows a turning radius $r_t$ for trailer rear axle group 36 and a turning radius $r_t'$ for tractor rear axle group 16 measured in that way.

Right dual wheels 38 form a right wheel group of trailer rear axle group 36, and left dual wheels 38 form a left wheel group of trailer rear axle group 36. Because each wheel group can rotate independently of the other, they rotate at different velocities as trailer 30 negotiates a curve.

In the same way, right dual wheels 24 form a right wheel group of tractor rear axle group 16, and left dual wheels 26 form a left wheel group of tractor rear axle group 16. Because axle group 16 is a drive axle, each wheel group is able to rotate at a different velocity from the other as tractor 10 negotiates a curve because the axle group has a differential mechanism between right and left wheel groups.

Length of a turning radius for an axle group may however be defined in various ways because every point along the length of a straight axle turns about the instantaneous center of turning at a different distance from the center. FIG. 5 shows one turning radius $r_{t1}$ measured to right wheel 20 and another turning radius $r_{t2}$ measured to left wheel 22.

Once a turning radius has been calculated, a calculation of articulation angle α between tractor and trailer can be made when conditions are favorable for doing so. The basis for calculation of articulation angle between tractor and trailer is explained with reference to FIGS. 5 and 6.

Figure 9:
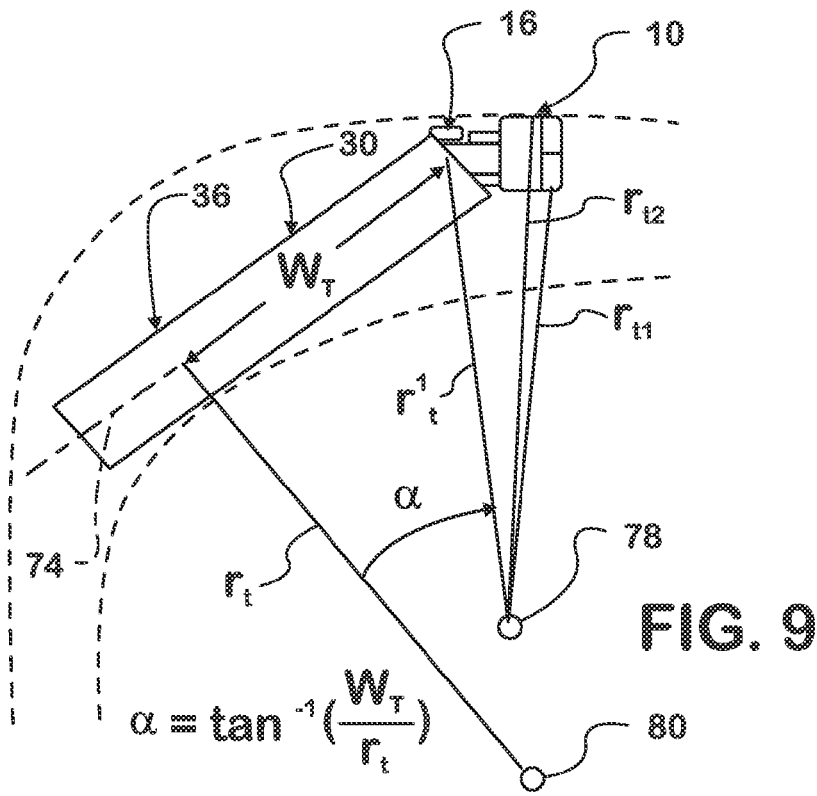
FIG. 9 is a top plan snapshot view correlated with FIG. 5.

During an early portion of a turn along a curve as shown by the FIG. 5 snapshot, tractor 10 turns sooner than trailer 30 and consequently a longitudinal centerline 74 of trailer 30 swings away from a longitudinal centerline 76 of tractor 10. Both the front and the rear axle groups of tractor 10 are turning about what can be considered approximately a common instantaneous center 78 in FIG. 5. The rear axle group of trailer 30 is turning about a different instantaneous center 80. This disparity is disclosed by the difference in length between the radii of turning of the two axle groups. However as shown in FIG. 9, an approximate measure of articulation angle α can be made by calculating the arctangent of a fraction whose numerator is distance along longitudinal centerline 74 between trailer rear axle group 36 and tractor rear axle group 16 ($W_T$) and whose denominator is the calculated turning radius of trailer rear axle group 36 ($r_t$).

Figure 6:
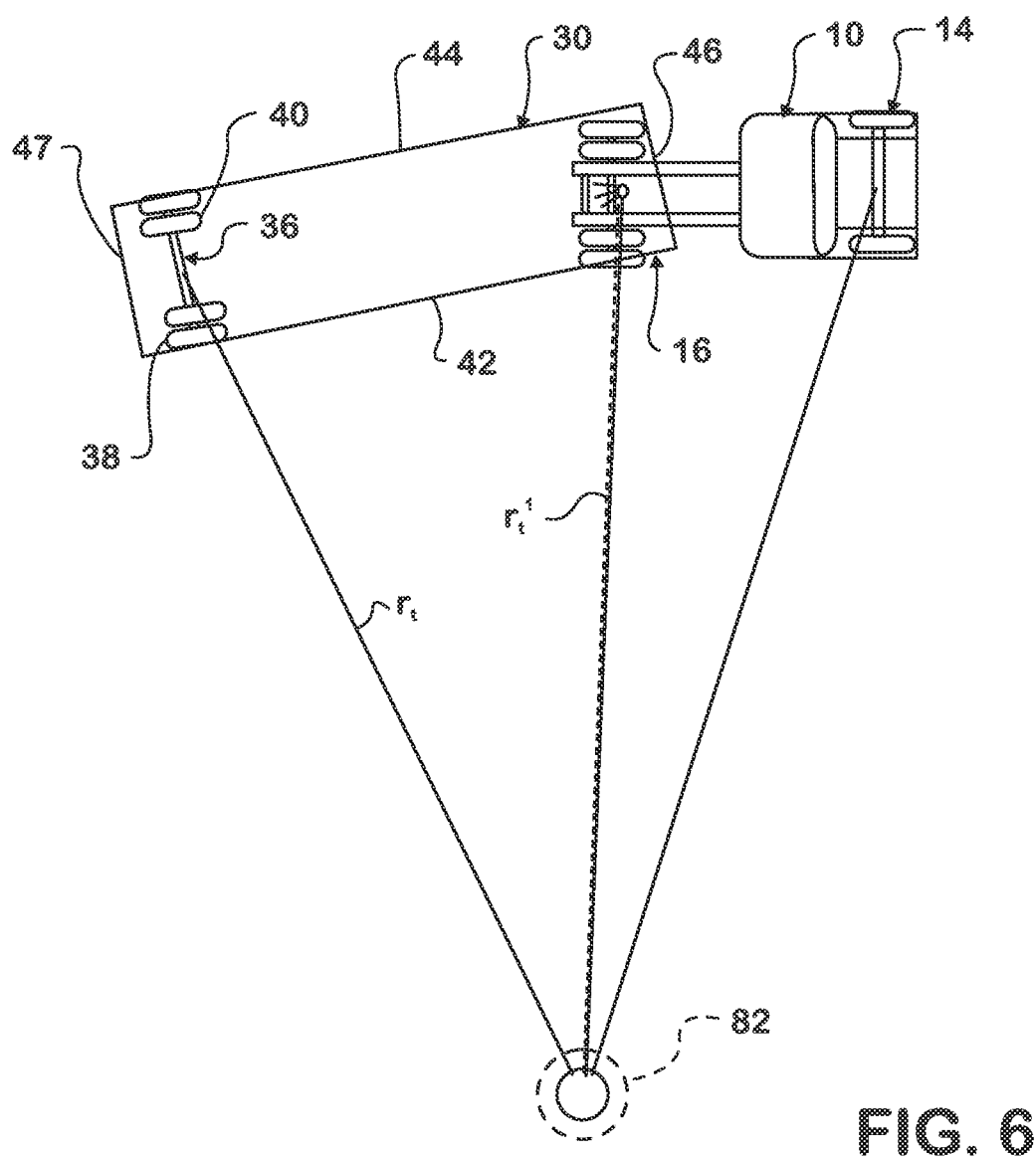
FIG. 6 is a top plan snapshot view of the tractor-trailer later into the turn to the right.

However, as the turn continues without any substantial change in the steering angle in which tractor 10 is being steered, instantaneous centers 78, 80 will move toward convergence, as suggested by FIG. 6, and therefore the instantaneous center of turning radius of trailer rear axle group 36 and that of the two axle groups 14, 16 of tractor 10 will also move toward convergence.

By using controller 56 to repeatedly calculate turning radius of trailer rear axle group 36 and turning radius of an axle group of tractor 10 at sufficiently frequent iteration rates, it is possible to determine when the instantaneous center of the turning radius of an axle group of tractor 10 and the instantaneous center of the turning radius of trailer rear axle group 36 are within a zone of coincidence 82 suitable for calculating an estimate of the turning radius and/or articulation angle to within a given tolerance.

Figure 10:
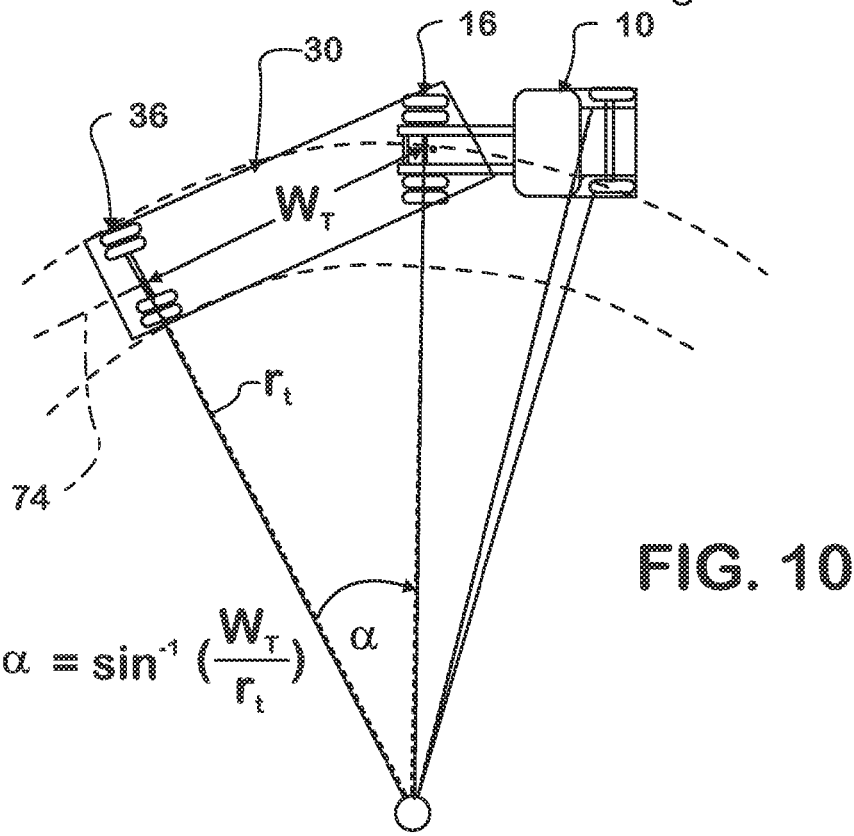
FIG. 10 is a top plan snapshot view correlated with FIG. 6.

The articulation angle $\alpha$ is calculated by calculating the arcsine of a fraction whose numerator is distance along longitudinal centerline 74 between trailer rear axle group 36 and tractor rear axle group 16 ($W_T$) and whose denominator is the calculated turning radius of trailer rear axle group 36 ($r_t$), as shown in FIG. 10.

Repeated calculations of the articulation angle which are performed at a sufficiently frequent iteration rate can be processed by an algorithm to calculate rate of change of the articulation angle.

Figure 4:
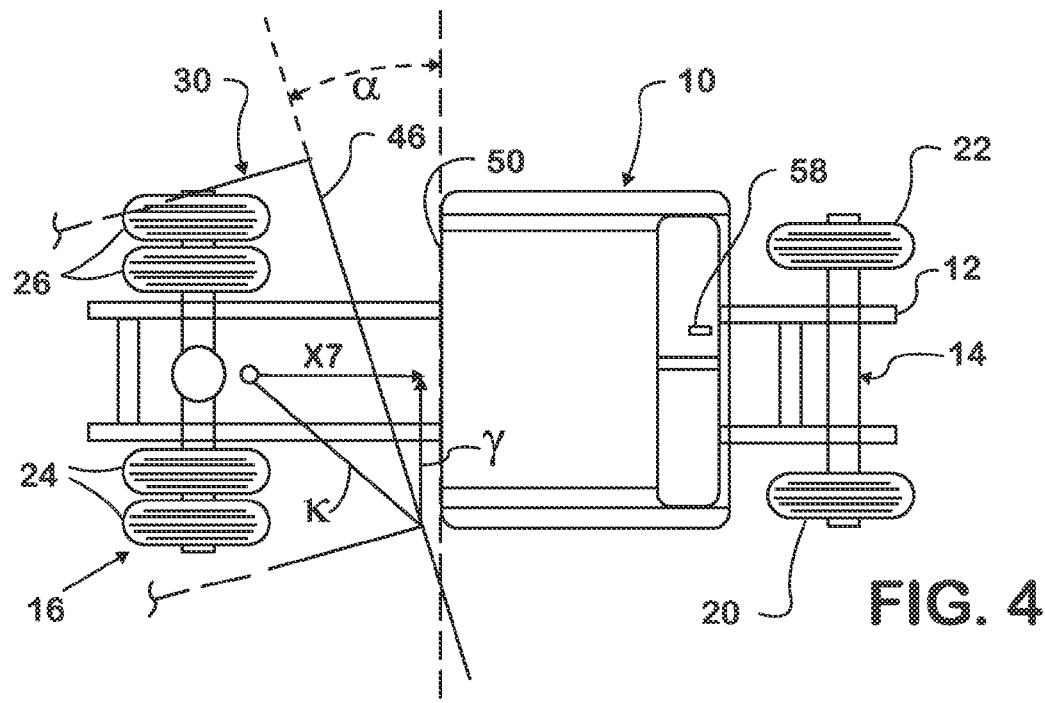
FIG. 4 is a view like FIG. 3 but showing the trailer following the tractor along a curve.

FIG. 4 shows how the plan view location of any point on trailer 30 can be calculated for any articulation angle within a range of articulation angles using the instantaneous value of the articulation angle $\alpha$ and the value of an angle b (shown in FIG. 3) which is the angle between a line extending from axis AX to a front corner of trailer 30 when the articulation angle $\alpha$ is 0°, i.e. when trailer longitudinal centerline 74 and tractor longitudinal centerline 76 are aligned. The example shown in FIG. 4 locates the right front corner of trailer 30 within an X-Y frame of reference. The X-coordinate of the location is given by k cos (b−a), and the Y-coordinate of the location is given by k sin (b−a), with k being length of the line extending from axis AX to a front corner of trailer 30, i.e. the horizontal distance of the corner from axis AX.

The locations of potential interferences between tractor and trailer during articulation can be tracked as a function of articulation angle. That functional relationship may then be used for any appropriate purpose such as control of a gap treatment device. It should be noted that a gap treatment device can remain deployed even on sharp curves at large articulation angles as long as no interference is indicated and turning radii of axle groups are stable.

The methodology which has been described can be used for closed-loop control of gap treatment between towing and towed vehicles. While different calculations of turning radius estimates may have different degrees of precision, the methodology is capable of distinguishing less precise estimates which should not be used for additional functions, such as gap treatment control, from those which are acceptable for use. Existing tractor-trailer configurations have equipment and devices which can implement the methodology without necessarily adding devices. Dimensional information used in the methodology is known from a tractor-trailer's configuration and rotational velocities of wheel groups is available in electronic data messages being broadcast by ABS (anti-lock brake) systems. If a particular tractor-trailer configuration has a yaw rate sensor in the tractor, the integral of yaw rate sensor data may be used to confirm absence of wheel slip which could lead to inaccurate calculation of turning radius estimates using the disclosed methodology.

Dead reckoning can provide an estimate of turning radius of a trailer rear axle group without using wheel group velocity data from wheel speed sensors of the trailer rear axle group when the tractor has been steered into a turn after the tractor-trailer has been moving in a straight line of travel. The turning radius estimate is calculated by mathematically integrating rotational velocity of an outer wheel group $\omega_o$ of the tractor and also mathematically integrating rotational velocity of an inner wheel group $\omega_i$ of the tractor during an interval of time beginning with commencement of the turn when the articulation angle is 0°. The outer and inner wheel groups may be on the same axle group or different axle groups.

The difference between the integration results at the end of the interval of time discloses how much farther the tractor outer wheel group has traveled along the roadway than the tractor inner wheel group during the interval of time. That difference can then be used to estimate turning radius of the trailer rear axle group at that time because of inherent lag in the trailer rear axle group's tracking the path of travel of the tractor. The estimated turning radius can then be used to estimate articulation angle at the end of the interval of time. The articulation angle measurement may have enough precision for use in gap control to operate a deployed fairing to a non-deployed position. If the estimate is continually repeated during the turn using the most recent estimate of articulation angle, the potential for error accumulation which is inherent in dead reckoning can render further estimates increasingly dubious. When using the turning radius estimate of the trailer rear axle group for tractor-trailer gap control, some knowledge of trailer dimensions is also used. If no specific information about a trailer is available, certain assumptions could be used: 1) the trailer rear axle group is at the largest possible distance of the tractor; 2) the tractor has the shortest possible wheelbase; and 3) the static tractor-trailer gap is the smallest possible.

The particular examples which are shown and described here are representative of broader principles. When two axle groups are turning about respective radii of turning whose instantaneous centers are within a defined zone of coincidence, it is possible to use outer wheel group rotational velocity from one axle group and inner wheel group rotational velocity from the other axle group provided that wheel diameters are substantially identical and that each axle group has the same length and mounting on its respective vehicle so that the outer and inner wheel groups of both axle groups follows substantially a common track.

Should the aforementioned conditions for using wheels groups on different axle groups not apply, wheel groups from different axle groups may still be used provided that dimensional and location differences are taken into account.

What is claimed is:

1. A towing vehicle—towed vehicle combination comprising:
   a towing vehicle;
   a towed vehicle which is towed by the towing vehicle through a coupling which allows the towed vehicle to articulate horizontally with respect to the towing vehicle over a range of articulation angles;
   the towing vehicle comprising a towing vehicle front axle group and a towing vehicle rear axle group;
   the towed vehicle comprising a towed vehicle rear axle group;
   a source of data indicative of rotational velocity of a radially outer wheel group of an axle group;

a source of data indicative of rotational velocity of a radially inner wheel group of an axle group;

a processor comprising an executable algorithm for processing data from the sources and a dimensional relationship of the radially outer wheel group to the radially inner wheel group to calculate an estimate of a turning radius for the towing vehicle and the towed vehicle, in which the dimensional relationship comprises the sum of the distance of the radially outer wheel group to a longitudinal centerline of its axle group and the distance of the radially inner wheel group to a longitudinal centerline of its axle group, and in which the algorithm, when executed to yield a calculation of an estimate of a turning radius, comprises multiplying rotational velocity of the radially outer wheel group by the sum of distance from the radially outer wheel group to a longitudinal centerline of its axle group and distance from the radially inner wheel group to a longitudinal centerline of its axle group to yield a multiplication product, subtracting the rotational velocity of the radially inner wheel group from the rotational velocity of the radially outer wheel group to yield a difference, dividing the difference into the multiplication product and from the result of that division, subtracting one-half the sum of the distance of the radially outer wheel group to the longitudinal centerline of its axle group and the distance of the radially inner wheel group to the longitudinal centerline of its axle group.

2. The towing vehicle—towed vehicle combination as set forth in claim 1 in which the algorithm, when executed, further comprises using the calculation of an estimate of a turning radius to calculate articulation angle.

3. The towing vehicle—towed vehicle combination as set forth in claim 2 in which the algorithm, when executed, calculates articulation angle by calculating arcsine of a distance along a longitudinal centerline of the towed vehicle between the towed vehicle rear axle group and the towing vehicle rear axle group divided by the calculation of an estimate of a turning radius.

4. The towing vehicle—towed vehicle combination as set forth in claim 2 in which the towing vehicle comprises a highway tractor which is propelled by an engine-driven powertrain and which has a cab, and the towed vehicle comprises a trailer body on a trailer chassis frame from which the towed vehicle rear axle group is suspended.

5. The towing vehicle—towed vehicle combination as set forth in claim 4 further comprising a gap treatment device which is selectively operable with respect to a gap between a front of the trailer body and a rear of the tractor cab to vary effect of the gap on aerodynamic drag when the vehicles are traveling.

6. The towing vehicle—towed vehicle combination as set forth in claim 1 in which the dimensional relationship comprises distance between the radially outer wheel group of a selected axle group and the radially inner wheel group of the selected axle group.

7. The towing vehicle—towed vehicle combination as set forth in claim 6 in which the algorithm, when executed to yield a calculation of an estimate of a turning radius, comprises multiplying rotational velocity of the radially outer wheel group of the selected axle group by distance between the radially outer wheel group of the selected axle group and the radially inner wheel group of the selected axle group to yield a multiplication product, subtracting the rotational velocity of the radially inner wheel group from the rotational velocity of the radially outer wheel group to yield a difference, dividing the difference into the multiplication product and from the result of that division, subtracting one-half the distance between the radially outer wheel group of the selected axle group and the radially inner wheel group of the selected axle group.

8. A towing vehicle—towed vehicle combination comprising:

a towing vehicle;

a towed vehicle which is towed by the towing vehicle through a coupling which allows the towed vehicle to articulate horizontally with respect to the towing vehicle over a range of articulation angles;

the towing vehicle comprising a towing vehicle front axle group and a towing vehicle rear axle group;

the towed vehicle comprising a towed vehicle rear axle group;

a source of data indicative of rotational velocity of a radially outer wheel group of a towing vehicle axle group;

a source of data indicative of rotational velocity of a radially inner wheel group of a towing vehicle axle group; and a processor comprising an executable algorithm for processing data from the sources to mathematically integrate rotational velocity of the radially outer wheel group of a towing vehicle axle group and mathematically integrate rotational velocity of the radially inner wheel group of a towing vehicle axle group over an interval of time beginning with commencement of a turn when the articulation angle is 0° and to use difference between a result of one integration and a result of the other integration to calculate an estimate of articulation angle at the end of the interval of time.

9. A method for calculating an estimate of a turning radius for a towing vehicle and a towed vehicle which is being towed by the towing vehicle through a coupling which allows the towed vehicle to articulate horizontally with respect to the towing vehicle over a range of articulation angles, the method comprising:

detecting rate of change of at least one of articulation angle and turning radius less than a target rate below which a center of a turning radius of an axle group of the towing vehicle and the center of a turning radius of an axle group of the towed vehicle are within a zone of coincidence suitable for calculating at least one of articulation angle and turning radius to within a given tolerance, with the centers lying within the zone of coincidence, taking a measurement of rotational velocity of a radially outer wheel group of an axle group and a measurement of rotational velocity of a radially inner wheel group of an axle group, and using the rotational velocity measurements and a dimensional relationship of the radially outer wheel group to the radially inner wheel group in a calculation of an estimate of a turning radius of the towing vehicle and the towed vehicle.

10. The method as set forth in claim 9 in which the dimensional relationship comprises the sum of the distance of the radially outer wheel group to a longitudinal centerline of its axle group and the distance of the radially inner wheel group to a longitudinal centerline of its axle group.

11. The method as set forth in claim 10 in which the calculation of an estimate of a turning radius comprises multiplying the measurement of rotational velocity of the radially outer wheel group by the sum of the distance of the radially outer wheel group to a longitudinal centerline of its axle group and the distance of the radially inner wheel group to a longitudinal centerline of its axle group to yield a multiplication product, subtracting the measurement of rotational velocity of the radially inner wheel group from the measurement of rotational velocity of the radially outer wheel group, dividing the difference into the multiplication product, and from that result subtracting one-half the sum of the distance of the radially outer wheel group to the longitudinal centerline of its axle group and the distance of the radially inner wheel group to the longitudinal centerline of its axle group.

12. The method as set forth in claim 9 further comprising using the calculation of an estimate of turning radius of the towing vehicle and the towed vehicle in a further calculation which calculates an estimate of articulation angle.

13. The method as set forth in claim 12 in which the further calculation calculates an estimate of articulation angle by calculating arcsine of a distance along a longitudinal centerline of the towed vehicle between a rear axle group of the towed vehicle and a rear axle group of the towing vehicle divided by the calculation of an estimate of the turning radius.

\* \* \* \* \*